United States Patent
Joshi et al.

(10) Patent No.: US 8,249,105 B2
(45) Date of Patent: Aug. 21, 2012

(54) METHOD FOR AGGREGATING FRAMES IN A WIRELESS COMMUNICATION NETWORK

(75) Inventors: Avinash Joshi, Lake Mary, FL (US);
Pankaj Aggarwal, Lake Mary, FL (US);
Manish Shukla, Altamonte Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1101 days.

(21) Appl. No.: 12/130,439

(22) Filed: May 30, 2008

(65) Prior Publication Data
US 2009/0296612 A1   Dec. 3, 2009

(51) Int. Cl.
*H04B 7/00* (2006.01)

(52) U.S. Cl. ........ 370/473; 370/470; 370/471; 370/472; 370/474; 370/476

(58) Field of Classification Search .................. None
See application file for complete search history.

(56) References Cited

U.S. PATENT DOCUMENTS

| | | | | |
|---|---|---|---|---|
| 6,611,536 | B1* | 8/2003 | Ahmed | 370/493 |
| 7,149,184 | B2* | 12/2006 | Takada et al. | 370/230 |
| 7,489,688 | B2* | 2/2009 | Giesberts et al. | 370/392 |
| 7,697,522 | B2* | 4/2010 | Kliger et al. | 370/389 |
| 7,729,236 | B2* | 6/2010 | Kneckt et al. | 370/208 |
| 7,760,629 | B2* | 7/2010 | Qian et al. | 370/230 |
| 2005/0238016 | A1* | 10/2005 | Nishibayashi et al. | 370/389 |
| 2006/0013256 | A1* | 1/2006 | Lee et al. | 370/473 |
| 2006/0018343 | A1* | 1/2006 | Rodrigo | 370/471 |
| 2006/0029099 | A1 | 2/2006 | Jang et al. | |
| 2006/0056443 | A1 | 3/2006 | Tao et al. | |
| 2006/0133344 | A1* | 6/2006 | Kang | 370/349 |
| 2007/0008947 | A1* | 1/2007 | Belcea | 370/350 |
| 2007/0104162 | A1 | 5/2007 | Kneckt et al. | |
| 2007/0116035 | A1 | 5/2007 | Shao et al. | |
| 2007/0280181 | A1* | 12/2007 | Matsuo et al. | 370/338 |

FOREIGN PATENT DOCUMENTS
EP   1619834 A1   1/2006

OTHER PUBLICATIONS

PCT/US09/045366, PCT Search Report and Written Opinion, mailed Oct. 9, 2009, 18 pages.
Ming Li et al, Adaptive Frame Concatenation Mechanisms for QoS in Multi-Rate Wireless Ad Hoc Networks, 27th Conference on Computer Communications, 2008, pp. 1786-1794.
Yuxia Lin and Vincent W.S. Wong—"Frame Aggregation and Optimal Frame Size Adaptation for IEEE 802.11n WLANs"—IEEE 2006—6pp.
Seongkwan Kim, Sung-Ju Lee, Sunghyun Choi—The Impact of IEEE 802.11 MAC Strategies on Multi-hop Wireless Mesh Networks—IEEE 2006—12pp.

* cited by examiner

*Primary Examiner* — Ian N Moore
*Assistant Examiner* — Brian T Le
(74) *Attorney, Agent, or Firm* — Randi L. Karpinia (57) ABSTRACT

A dynamic and distributive aggregation method in which a node determines the frame size of an aggregated frame based on or according to a transmission time of one or more of the received frames. This scheme to aggregate frames is based on the average packet size and average transmission time in the neighborhood. The method enables the aggregated packet size to dynamically change based on the neighborhood conditions. Usage of link rates and fair transmission time assignment enables the high data rate nodes to send more traffic but not to an extent of over-utilizing the channel thus achieving higher throughput efficiencies while maintaining fairness within a high data rate multi-hop wireless communication network.

9 Claims, 5 Drawing Sheets

METHOD FOR AGGREGATING FRAMES IN A WIRELESS COMMUNICATION NETWORK

FIELD OF THE DISCLOSURE

The present disclosure relates generally to wireless communications and more particularly to aggregation of frames in a high data rate wireless communication network.

BACKGROUND

A wireless mesh network is a collection of wireless nodes or devices organized in a decentralized manner to provide range extension by allowing radios to be reached across multiple hops. Wireless mesh networks are based on self-configuring autonomous collections of portable devices that communicate with each other over wireless links having limited bandwidths. In a mesh network, communication packets sent by a source node thus can be relayed through one or more intermediary nodes before reaching a destination node. Mesh networks may be deployed as temporary packet radio networks that do not involve significant, if any, supporting infrastructure. Rather than employing fixed base stations, in some mesh networks each user node can operate as a router for other user nodes, thus enabling expanded network coverage that can be set up quickly, at low cost, and which is highly fault tolerant. In some mesh networks, special wireless routers also can be used as intermediary infrastructure nodes. Large networks can be realized using intelligent access points (IAPs), also known as gateways or portals, which provide wireless nodes with access to a wired backhaul or wide area network (WAN).

Enterprise-class, bandwidth-intensive applications, workgroup computing applications, and some wireless backhaul applications require throughputs larger than current Institute of Electrical and Electronics Engineers (IEEE) 802.11a/b/g technologies can provide. In addition to throughput, the IEEE 802.11n protocol significantly enhances the reliability and range of existing IEEE 802.11 networks. The standard defines procedures by which throughputs greater than several hundred Mega bits per second (Mbps) along with significant range improvements are possible. (Any IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.)

Figure 1:
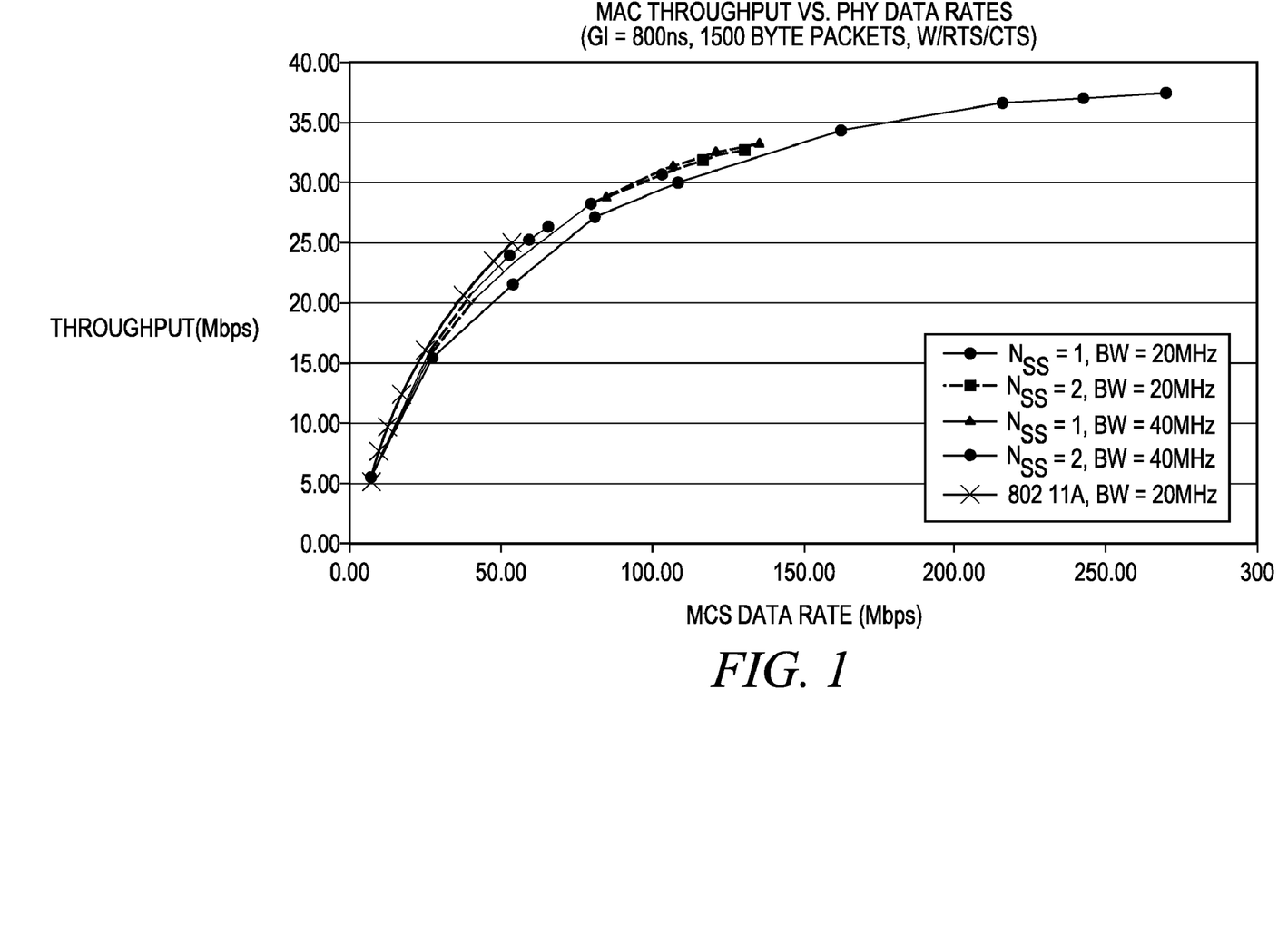
FIG. 1 is a graph illustrating theoretical MAC throughput for 1500 byte packet size versus physical layer data rates in 802.11n.

IEEE 802.11n provides Physical Layer (PHY) and Media Access Control (MAC) enhancements for high throughput modes with high data rates. For example, with a 800 nanosecond (nsec) guard interval, two spatial streams, and operating on a forty (40) Mega Hertz (MHz) bandwidth, data rates reach up to 270 Mbps. FIG. 1 illustrates the theoretically calculated MAC throughput for a 1500 byte packet size when using the IEEE 802.11n data rates. As illustrated, despite the fact that the PHY data rates go as high as 270 Mbps, the MAC layer throughput begins to saturate around 25 Mbps and attains a maximum value of only 38 Mbps. (Here "Nss" is defined as the number of spatial streams, Bandwidth (BW) is defined as the channel bandwidth in MHz).

At high data-rates, the carrier-sense multiple access with collision avoidance (CSMA/CA) mechanism becomes a bottleneck in transferring the high gains in the data rate to higher user throughput. Every frame transmitted by an IEEE 802.11 device has fixed overhead associated with the radio preamble and MAC frame fields that limit the effective throughput, even if the actual data rate was infinite.

Figure 2:
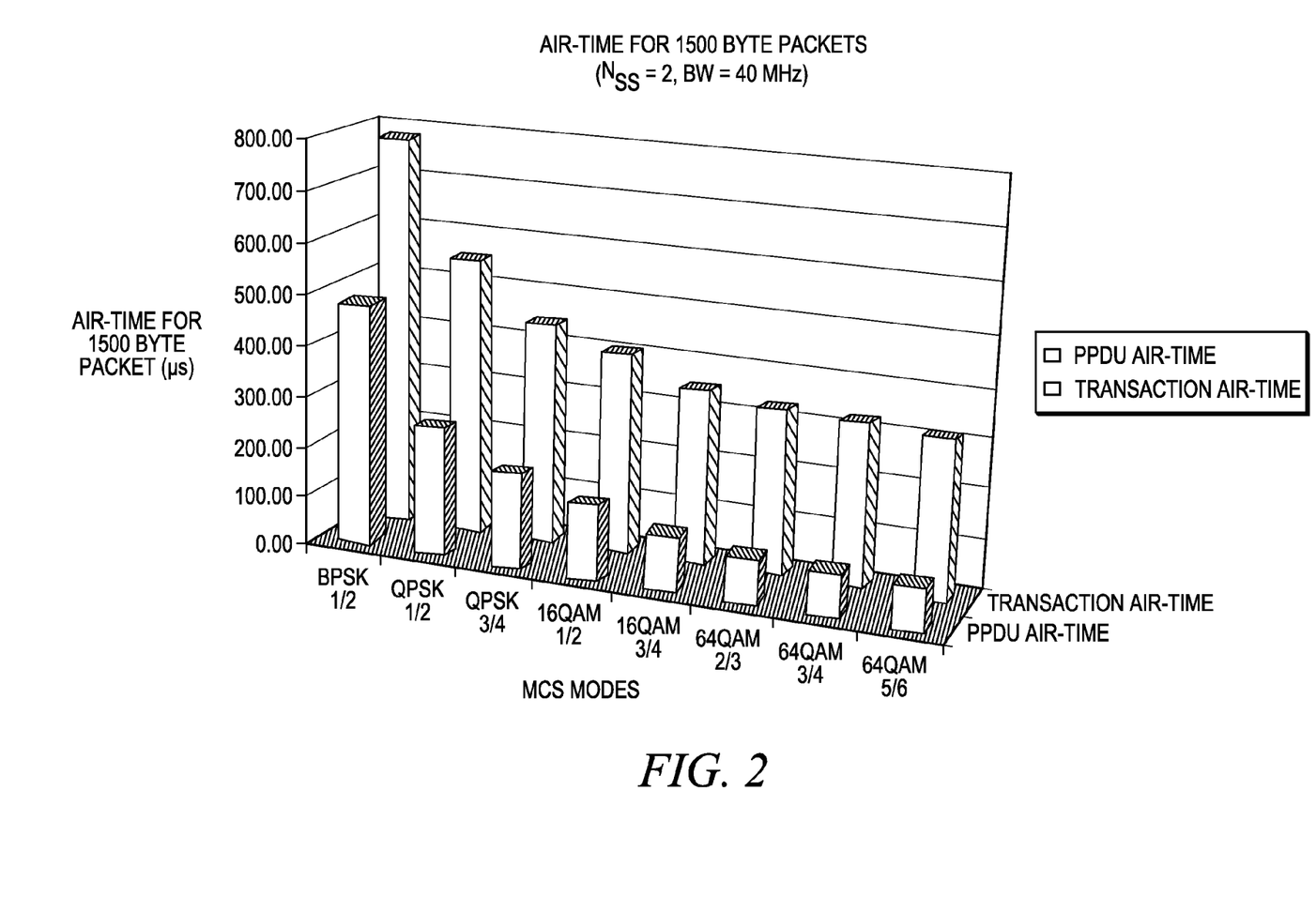
FIG. 2 is a graph illustrating over-the-air transaction time for 1500 byte packets.

FIG. 2 highlights the reason for low throughput in IEEE 802.11n. Although the data packets themselves are transmitted at the high data rates, control messages and headers are transmitted at low data rates (BSSBasicRateSet), thus resulting in significantly longer transaction air-times per packet. With high data rates, Physical Layer Convergence Protocol (PLCP) protocol data unit (PPDU) transmission is quick but inter-frame spacing, deference and backoff add significant overhead to overall packet transaction air-time. FIG. 2 illustrates the significant difference between packet Transaction Air-time and PPDU air-time. "PPDU Air-time" represents the transmission time of the data packet alone. "Transaction Air-time" represents the total air time including deference, transmission times of RTS, CTS, data packet and ACK, and the inter frame spaces.

Frame aggregation is a mechanism to alleviate the previously described deficiencies. With frame aggregation, once a station acquires the medium for transmission, potentially long packets can be transmitted without significant delays between transmissions and thus reducing the effect of MAC overhead and inefficiencies. IEEE 802.11n devices can send multiple frames per single access and supports two forms of frame aggregation: Aggregated Mac Service Data Unit (A-MSDU) and Aggregated Mac Protocol Data Unit (A-MPDU).

IEEE 802.11n does not specify any method or algorithm to decide when and how many packets can be aggregated to build an aggregated-frame. There is a need of dynamic and distributive methodology that computes when and how much to aggregate to take advantage of high data rates supported in wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In order to achieve high throughput for high data rates in IEEE 802.11n, aggregation is necessary. 802.11n proposes two kinds of aggregation, one at MAC level and other at PHY level. But it does not address when and how many frames to aggregate.

There can be multiple approaches for aggregation. A node can decide to aggregate and build a huge aggregated-frame, but it will take large amount of air time for packet transmission. This may cause channel hogging by this node.

In an approach to avoid channel hogging or unfairness, the present invention provides a dynamic aggregation method in which a node determines a transmission time for the aggregated frame based on or according to a transmission time of one or more of the received frames. The determined transmission time provides the upper limit of the size of the aggregated packet. There are a number of different methods in which a transmission time for an aggregated frame may be determined.

The present invention provides a dynamic aggregation scheme based on the link rate and fair transmission time assignment to achieve higher throughput efficiencies while maintaining fairness within a high data rate wireless communication network, for example, in a Mesh network. The method to aggregate frames is based on the average packet size and the average transmission time in the neighborhood. This method enables the aggregated packet size to dynamically change based on the neighborhood conditions. The method targets fairness in a way that enables the nodes capable of sending at high data-rates to send more traffic but not to an extent of over-utilizing the channel.

In an approach to preserve data transmission time fairness, a node, when sending a packet over a high data rate link, can build an aggregated-frame such that the total over-the-air data transmission time for this aggregated-frame remains similar to the average data transmission time in its neighborhood.

Figure 3:
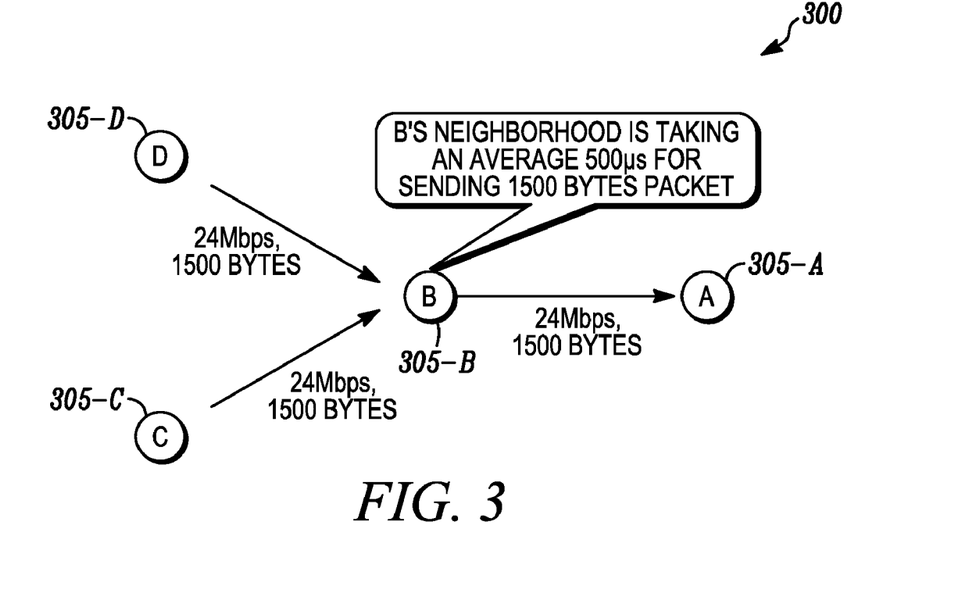
FIG. 3 is block diagram of an example network illustrating the concept of fairness with aggregation.

FIG. 3 illustrates an example network 300. The network 300, for example, can be a Mesh network based on any IEEE 802 technology (e.g. IEEE 802.11a/b/g/n/s, IEEE 802.16) or any proprietary radio technology. It will be appreciated by those of ordinary skill in the art that the network 300 in accordance with the present invention can alternatively comprise any packetized communication network where packets are forwarded across multiple wireless hops. For example, the network 300 can be a network utilizing packet data protocols such as OFDMA (orthogonal frequency division multiple access), TDMA (time division multiple access), GPRS (General Packet Radio Service) and EGPRS (Enhanced GPRS).

The network 300, as illustrated, includes four nodes 305-A, 305-B, 305-C, and 305-D communicatively coupled to each other. It will be appreciated that the four nodes is just an example and that any number of nodes can be utilized within the network 300. The nodes 305 can be one or more routers, access points, subscriber stations, mesh points, mobile nodes, or any other communication devices.

In this application, the terms "packet" and "frame" have been used interchangeably.

In the example network 300, Nodes 305-C and 305-D are each sending one (1) packet (1500 bytes) to node 305-B with a 24 Mbps data rate. In this example, it takes 500 microseconds (µs) for each data frame transmission. Node 305-B's link to node 305-A is also on a 24 Mbps data rate and it is also sending a 1500 bytes packet whenever it obtains channel access. Node 305-B's neighborhood is taking 500 microseconds (µs) average time for a data transmission.

Figure 4:
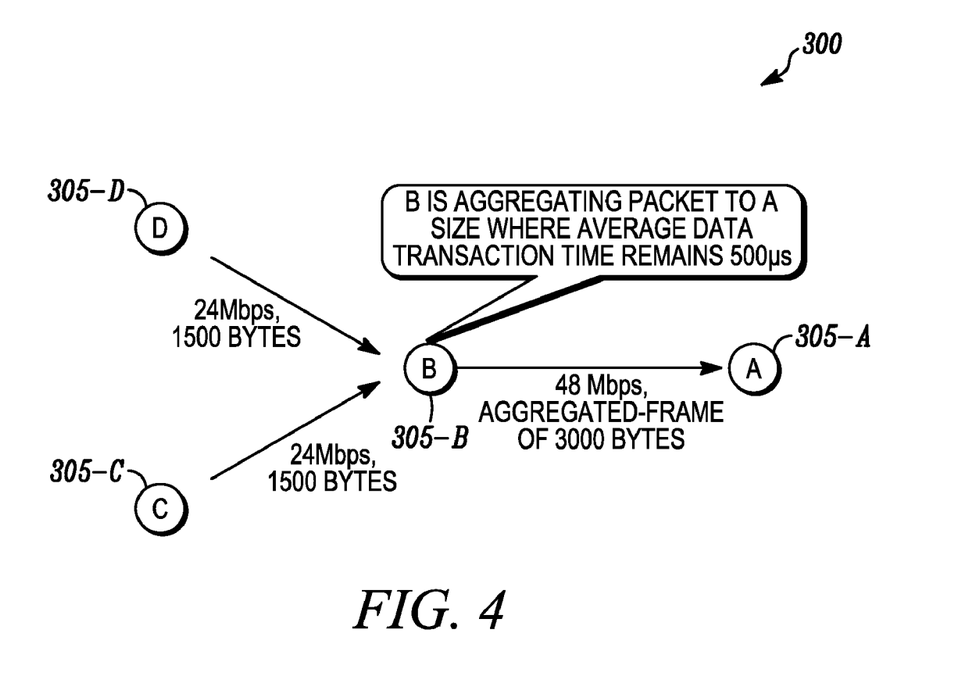
FIG. 4 is a block diagram of an example network illustrating the concept of fairness with aggregation.

FIG. 4 illustrates the network 300 when the link between node 305-B and node 305-A has become fast and operates on a 48 Mbps data rate. Since node 305-B's neighborhood still takes 500 µs for data transmission, it can now aggregate 3000 bytes packet and send it to node 305-A which is within the same average neighborhood data transmission time.

How to Find Average Data Transmission Time (AvgTxTime) in Neighborhood on Each Node In accordance with the present invention, each node uses average packet length and average transmission times of received packets to calculate an average data transmission time (AvgTxTime) in the neighborhood. Average packet length is referred to as AvgPktLen and calculated using the information from received data packets. Similarly, for each packet received by this node, it calculates the perceived transmission time (PTT) for it. PTT is a function of AvgPktLen received on the node as shown and discussed below.

In accordance with the present invention, when a node receives a packet of B bytes in T seconds from a neighbor node, it will first calculate the perceived transmission time (PTT) for this received packet as:

$$PTT = (AvgPktLen/B) * T$$

Where:

B is a packet size in bytes of the received packet. This will be used to update the AvgPktLen as described below.

T is the actual transmission time in seconds for the received packet.

AvgPktLen is an average packet length of received packets. It can be calculated in several ways. In one embodiment it can be a moving or a weighted average value over a period of time. In another embodiment it can be a simple average of received packet lengths over time as shown by following equation:

$$AvgPktLen_{new} = (AvgPktLen_{previous} + B)/2$$

Next, the node will calculate/update AvgTxTime as:

$$AvgTxTime = \text{weighted/moving average of all } PTTs$$

The node can aggregate a packet up to a size where the transmission time for the aggregated-frame is limited to AvgTxTime.

Figure 5:
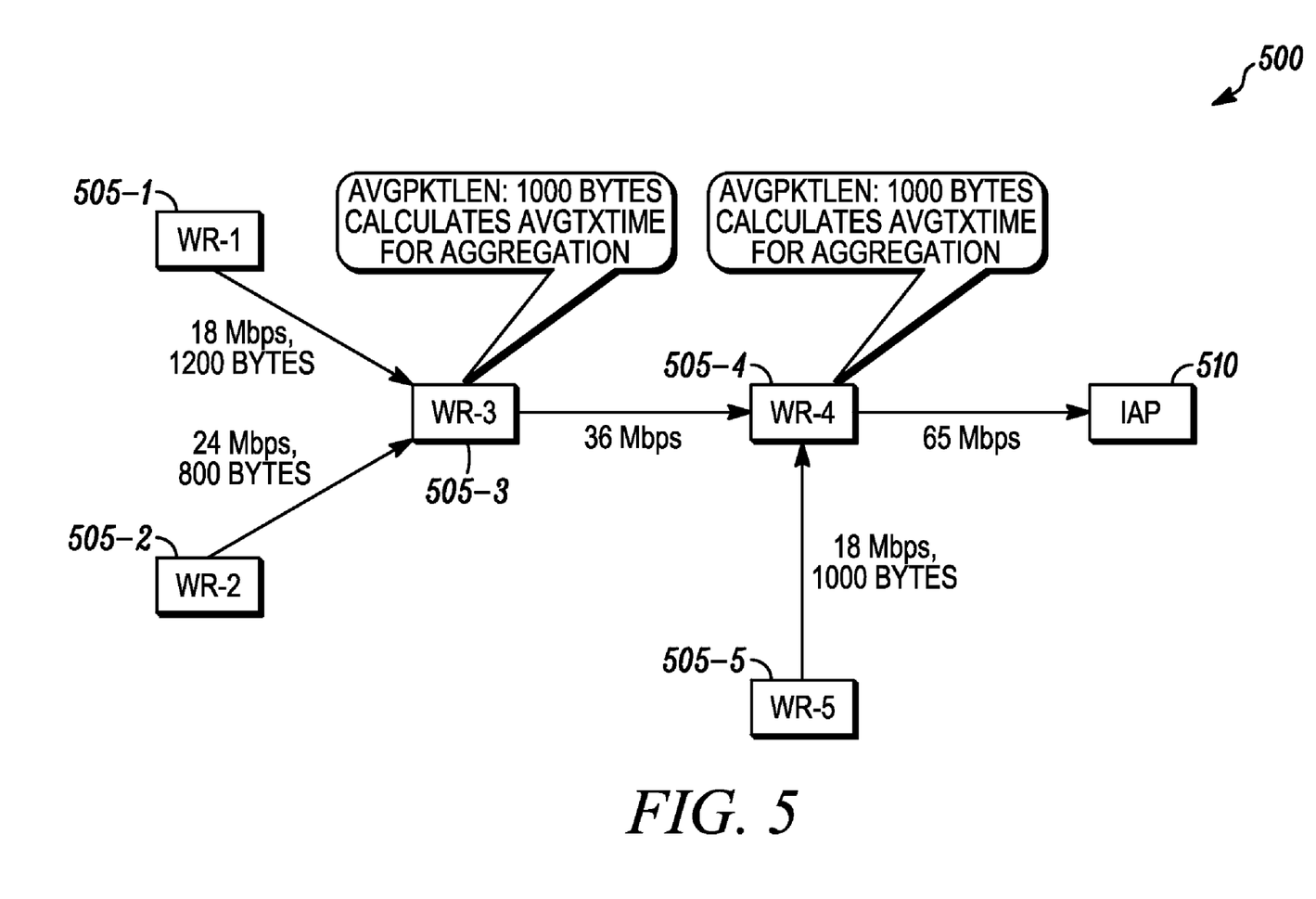
FIG. 5 is a block diagram of an example network illustrating detailed computations of an aggregation methodology in accordance with some embodiments.

FIG. 5 is an example network for illustrating the calculating of the variables by each node and the aggregation decision making process at individual nodes. FIG. 5 further illustrates how a change in Data Rate of links improves aggregation benefits, thereby keeping spatial fairness in the system.

The example network 500 includes five wireless routers (WR) 505-1 through 505-5 communicatively coupled to each other either directly or indirectly. It will be appreciated that any number of wireless routers can be operating within the network in accordance with the present invention. The network 500 also includes an intelligent access point (IAP) 510. FIG. 5 illustrates node connectivity, data flow and link data rates within the network 500. In the example network 500, WR 505-1 is sending 1200 byte packet at 18 Mbps to WR 505-3. WR 505-2 is sending 800 bytes packet at 24 Mbps to WR 505-3. For this example, it is assumed that AvgPktLen at WR 505-3 and WR 505-4 is 1000 bytes.

WR-3 AvgTxTime calculations:

Time taken for 1200 bytes packet transfer from WR 505-1 = 533.33 µs

Perceived Transmit Time calculated by WR 505-3 (PTT-1) = (1000/1200) * 533.33 = 444.4 µs Time taken for 800 bytes packet transfer from WR 505-2=266.66 µs Perceived Transmit Time calculated by WR 505-3 (PTT-2)=(1000/800)*266.66=333.3 µs AvgTxTime @ WR 505-3=(444.4+333.3)/2=388.8 µs WR 505-3 with 36 Mbps can aggregate and send up to 1750 bytes of data in one channel access Update AvgPktLen=(1000+1200+800)/3=1000 bytes It will be appreciated by those of ordinary skill in the art that although in this example calculations simple averages are being calculated, however, in accordance with the present invention a simple, moving or weighted average can be implemented in the system.

Figure 6:
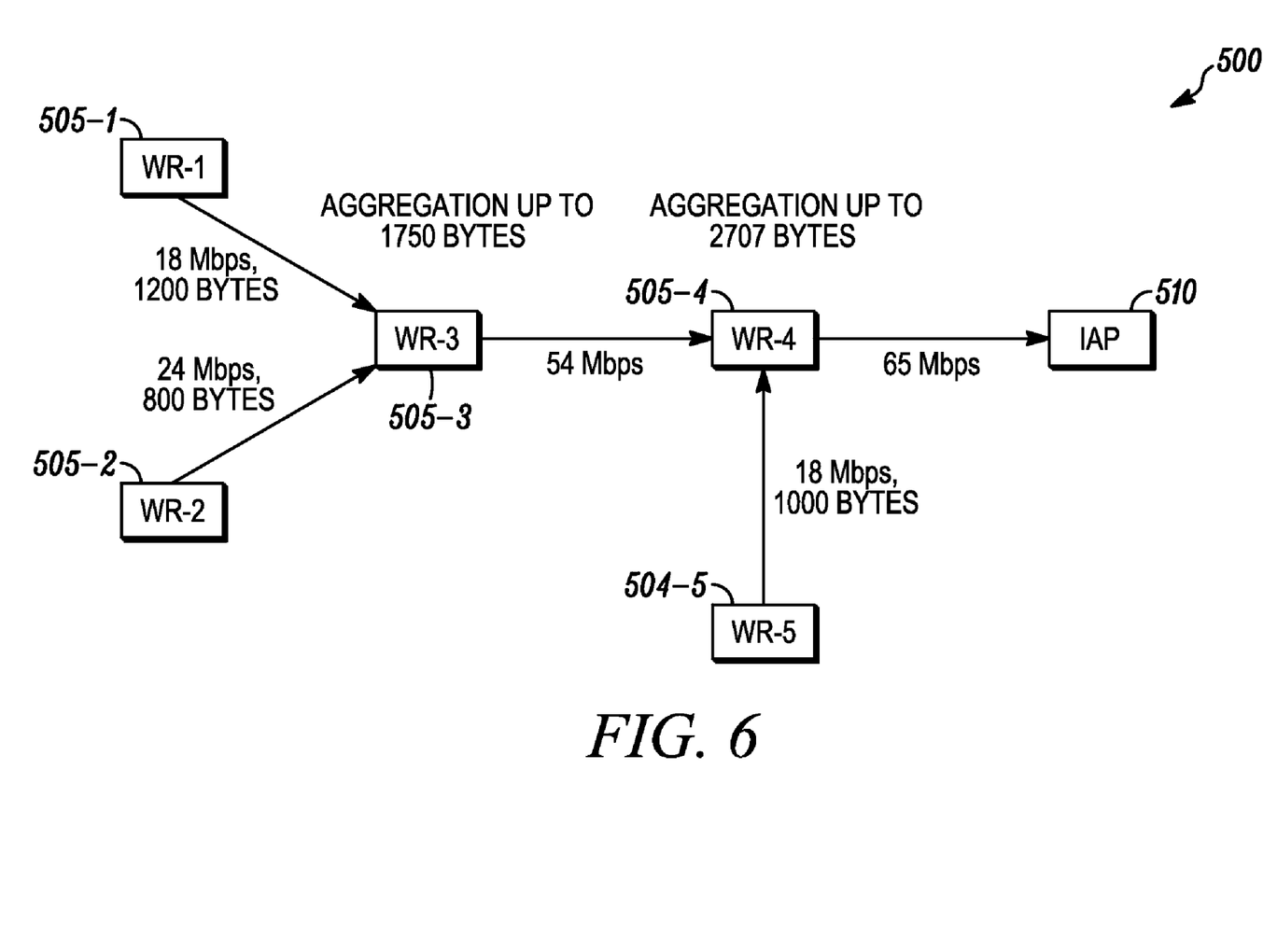
FIG. 6 is an example network illustrating aggregation in accordance with some embodiments.

WR-4 AvgTxTime Calculations:

Time taken for 1750 bytes packet transfer at 36 Mbps from WR 505-3 to WR 505-4=388.8 µs Perceived Transmit Time calculated by WR 505-4 (PTT-4)=(1000/1750) 388.8=222.1 µs Time taken for 1000 bytes packet transfer from WR 505-5=444.4 µs Perceived Transmit Time calculated by WR 505-4 (PTT-5)=(1000/1000)*444.4=444.4 µs AvgTxTime @ WR 505-4=(444.4+222.1)/2=333.2 µs WR 505-4 with 65 Mbps can aggregate and send up to 2707 bytes of data in one channel access Update AvgPktLen=(1000+1750+1000)/3=1250 bytes FIG. 6 illustrates at a later time, the Data rate of the link between WR 505-3 and WR 505-4 changes from 36 Mbps to 54 Mbps:

At WR 505-3:

AvgTxTime (WR 505-3 remains same=388.8 µs

WR 505-3 with 54 Mbps can aggregate and send up to 2624 bytes of data in one channel access Update AvgPktLen=(1000+1200+800)/3=1000 bytes At WR 505-4:

Time taken for 2624 bytes packet transfer from WR-3=388.8 µs

Perceived Transmit Time calculated by WR 505-4 (PTT-4)=(1250/2624) 388.8=185.2 µs Time taken for 1000 bytes packet transfer from WR 505-5=444.4 µs Perceived Transmit Time calculated by WR 505-4 (PTT-5)=(1250/1000) 444.4=555.5 us AvgTxTime @ WR 505-4=(555.5+185.2)/2=370 µs WR 505-4 with 65 Mbps can aggregate and send up to 3006 bytes of data in one channel access Update AvgPktLen=(1250+2624+1000)/3=1624 bytes Hence, we see that with increase in data rate for link between WR 505-3 and WR 505-4, WR 505-3 starts aggregating more. This in-turn affects the aggregation at WR 505-4 as well. It increases it slightly, keeping the average data transmission in the neighborhood fair.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for aggregating frames in a wireless multi-hop communication network at a node operating within the wireless multi-hop communication network, the method comprising:
   receiving a plurality of frames;
   creating an aggregated frame based on the plurality of received frames; and
   determining a frame size of the aggregated frame such that a transmission time for transmitting the aggregated frame is less than or equal to an average perceived transmission time of one or more of the plurality of received frames, wherein the average perceived transmission time for the one or more of the plurality of received frames is determined as a function of an average packet length on the node, a number of bytes in each received frame, and a time duration of receiving each frame.

2. A method for aggregating frames in a wireless communication network comprising:
   at a node within the wireless communication network:
      receiving one or more packets including one or more information;
      calculating an average packet length using the information from the received packets;
      calculating a perceived transmission time for each received packet as a function of the average packet length, a number of bytes in the received packet, and a time duration of receiving the packet;
      averaging the perceived transmission times to calculate an average neighborhood data transmission time; and
      aggregating a packet to transmit to another node to an aggregated frame size where a transmission time of the aggregated packet is less than or equal to the average neighborhood data transmission time.

3. The method of claim 2, further wherein when the node receives a packet of a quantity of bytes, the quantity of bytes of the received packet are used to update the average packet length value.

4. The method of claim 2, wherein the average neighborhood data transmission time is calculated as one of a weighted average and a moving average of all calculated perceived transmission times.

5. The method of claim 2, further comprising:
   periodically repeating the receiving, average packet length calculating, perceived transmission time calculating, and average neighborhood data transmission time calculating operations.

6. The method of claim 2, further comprising:
   repeating the receiving, average packet length calculating, perceived transmission time calculating, and average neighborhood data transmission time calculating operations when a packet is received.

7. The method of claim 2, further comprising:
   repeating the receiving, average packet length calculating, perceived transmission time calculating, and average neighborhood data transmission time calculating operations prior to aggregating the packet for transmission.

8. The method of claim 2, further comprising:
   repeating the receiving, average packet length calculating, perceived transmission time calculating, and average neighborhood data transmission time calculating operations when a change in data rate is detected.

9. The method of claim 2, wherein the wireless communication network is a high data rate communication network.

* * * * *

UNITED STATES PATENT AND TRADEMARK OFFICE
CERTIFICATE OF CORRECTION

PATENT NO. : 8,249,105 B2
APPLICATION NO. : 12/130439
DATED : August 21, 2012
INVENTOR(S) : Joshi et al.

It is certified that error appears in the above-identified patent and that said Letters Patent is hereby corrected as shown below:

In Column 5, Line 19, delete "388.8" and insert -- *388.8 --, therefor.

In Column 5, Line 32, delete "(WR" and insert -- @ WR --, therefor.

In Column 5, Line 41, delete "388.8" and insert -- *388.8 --, therefor.

In Column 5, Line 45, delete "444.4" and insert -- *444.4 --, therefor.

Signed and Sealed this
Fifth Day of February, 2013

Teresa Stanek Rea
*Acting Director of the United States Patent and Trademark Office*